(12) United States Patent
Shylanski

(10) Patent No.: US 11,112,239 B1
(45) Date of Patent: Sep. 7, 2021

(54) METHOD FOR TIRE SHOULDER TREAD WEAR EVALUATION

(71) Applicant: Hunter Engineering Company, St. Louis, MO (US)

(72) Inventor: Mark S. Shylanski, University City, MO (US)

(73) Assignee: HUNTER ENGINEERING COMPANY, St. Louis, MO (US)

( * ) Notice: Subject to any disclaimer, the term of this patent is extended or adjusted under 35 U.S.C. 154(b) by 338 days.

(21) Appl. No.: 16/183,523

(22) Filed: Nov. 7, 2018

Related U.S. Application Data

(60) Provisional application No. 62/584,419, filed on Nov. 10, 2017.

(51) Int. Cl.
*G01B 21/18* (2006.01)

(52) U.S. Cl.
CPC .................. *G01B 21/18* (2013.01)

(58) Field of Classification Search
CPC ....... B60C 11/246; B60C 11/24; G01B 11/22; G01H 17/00; G01H 1/00; G01M 17/027; G01M 1/225
See application file for complete search history.

(56) References Cited

U.S. PATENT DOCUMENTS

| | | | |
|---|---|---|---|
| 3,918,816 A | 11/1975 | Foster et al. | |
| 5,054,918 A | 10/1991 | Downing et al. | |
| 5,245,867 A | 9/1993 | Sube et al. | |
| 5,249,460 A | 10/1993 | Dory et al. | |
| 5,895,845 A | 4/1999 | Burger | |
| 5,987,978 A | 11/1999 | Whitehead | |
| 6,034,676 A | 3/2000 | Egan et al. | |
| 6,069,966 A | 5/2000 | Jones et al. | |
| 6,565,281 B2 | 3/2003 | Conheady | |
| 6,789,416 B1 | 9/2004 | Tracy et al. | |
| 7,269,997 B2 | 9/2007 | Dale | |
| 7,454,841 B2 | 11/2008 | Burns, Jr. et al. | |
| 7,466,430 B2 | 12/2008 | Braghiroli | |
| 7,523,655 B2 | 4/2009 | Braghiroli | |
| 7,587,180 B2 | 8/2009 | Lionetti | |
| 7,583,372 B2 | 9/2009 | Shylanski et al. | |
| 7,797,995 B2 | 9/2010 | Schafer | |
| 7,975,540 B2 | 6/2011 | Angell | |
| 8,065,911 B2 | 11/2011 | Taylor | |
| 8,141,414 B2 | 3/2012 | Braghiroli | |
| 8,171,783 B2 | 5/2012 | Tracy et al. | |
| 8,312,766 B2 | 11/2012 | Pingel | |
| 9,046,446 B1 | 6/2015 | Carroll et al. | |
| 9,677,973 B1 | 6/2017 | Carroll et al. | |
| 9,805,697 B1 | 10/2017 | Dorrance et al. | |
| 10,789,773 B2 * | 9/2020 | Zoken | B60C 11/24 |
| 10,830,908 B2 * | 11/2020 | Siegel | B60C 11/246 |

(Continued)

FOREIGN PATENT DOCUMENTS

| | | |
|---|---|---|
| DE | 4316984 A1 | 8/1994 |
| DE | 19705047 A1 | 8/1998 |

(Continued)

*Primary Examiner* — Elias Desta
(74) *Attorney, Agent, or Firm* — Sandberg Phoenix & von Gontard, P.C.

(57) ABSTRACT

A method for evaluating a plurality of tread depth measurements within a shoulder surface region of a tire to detect or identify the presence of excessive or non-uniform wear on the tire shoulder.

9 Claims, 8 Drawing Sheets

(56) References Cited

U.S. PATENT DOCUMENTS

| | | |
|---|---|---|
| 2005/0052657 A1 | 3/2005 | Braghiroli |
| 2006/0273148 A1 | 12/2006 | Karstens |
| 2006/0274302 A1 | 12/2006 | Shylanski et al. |
| 2008/0256815 A1 | 10/2008 | Schafer |
| 2010/0180676 A1 | 7/2010 | Braghiroli et al. |
| 2019/0226833 A1* | 7/2019 | Rhoades ............... G06T 7/0004 |

FOREIGN PATENT DOCUMENTS

| | | |
|---|---|---|
| EP | 0469948 B1 | 10/1995 |
| EP | 1148328 B1 | 10/2001 |
| EP | 1947419 A1 | 7/2008 |
| EP | 1952092 B1 | 4/2009 |
| EP | 1751493 B1 | 8/2013 |
| JP | 8122043 A | 5/1996 |
| WO | 199610727 A1 | 4/1996 |
| WO | 199707380 A2 | 2/1997 |
| WO | 2010100417 A2 | 9/2010 |
| WO | 2010115390 A1 | 10/2010 |
| WO | 2013007479 A1 | 1/2013 |

\* cited by examiner

METHOD FOR TIRE SHOULDER TREAD WEAR EVALUATION

CROSS-REFERENCE TO RELATED APPLICATIONS

The present application is related to, and claims priority from, U.S. Provisional Patent Application Ser. No. 62/584,419 filed on Nov. 10, 2017, which is herein incorporated by reference.

STATEMENT REGARDING FEDERALLY SPONSORED RESEARCH

Not Applicable.

BACKGROUND OF THE INVENTION

The present application is related generally to tire tread depth measurement, and in particular, to the evaluation of tire tread depth measurement data acquired across a portion of a tire tread circumferential surface which includes at least one shoulder region of the tire to identify excessively worn or bald regions on the tire tread surface.

Tire tread evaluation and tread depth measurement is an important component of a vehicle inspection process. As tires wear, the tire tread surface is worn away, decreasing the depth the main grooves and notches in the tread surface, reducing the ability of the tire to evacuate water from between the tire tread and a wet road surface, increasing the risk of hydroplaning, loss of vehicle control, and vehicle stopping distances on wet surfaces. Many jurisdictions mandate that vehicle tires be replaced upon reaching a minimum tread depth. Accordingly, both manual and automatic tire tread depth inspection systems have been developed to aid in determining accurate measurements of tire tread depth for the wheels on a vehicle. However, not all tire wear is uniform across the tread surface, as shown in FIG. 1. Tires can wear in a non-uniform manner due to the particular placement of the tire on the vehicle, the vehicle's wheel alignment condition, driving style, suspension system design, or due to tire damage.

Current tire tread depth measurement systems, which acquire multiple measurements representative of tread depth across the lateral width of a tire tread surface may not detect or identify the presence of non-uniform wear on a tire tread surface, particularly if the tread wear is concentrated in a specific region of the tire tread surface, such as the shoulder area, resulting in a smooth, bald or "flat" surface within which no significant variations in tire tread depth are observed.

Accordingly, it would be advantageous to provide a tire tread depth measurement system with a method for detecting or identifying the presence of non-uniform wear on a tire tread surface, where the non-uniform wear is characterized by the presence of a smooth, bald, or "flat" surface on the tire.

BRIEF SUMMARY OF THE INVENTION

A method for evaluating a plurality of tread depth measurements from a surface region of a tire, such as in proximity to the tire tread to sidewall transition, to detect or identify the presence of non-uniform wear on the tire tread surface, where the non-uniform wear is characterized by the presence of a smooth, bald, or featureless surfaces on the tread portion of the tire.

In one embodiment, the method requires an initial step of acquiring a plurality of tire tread measurements representative of tread depths within a region of interest extending both laterally and circumferentially over a portion of the tire tread surface. Preferably, the region of interest includes a portion of at least one shoulder of the tire tread surface. From the plurality of tire tread measurements, a representation of a convex surface across the lateral dimension of the region of interest is established. One or more regions of the convex surface representation exhibiting a greater change in surface slope are identified as transitions separating the tire tread surface from the inner and/or outer tire sidewall surfaces. Tire tread surfaces in the vicinity of the surface slope transition are further identified as tire tread shoulder regions. Once the tire tread shoulder regions are identified, tire tread measurements within the shoulder regions, which are laterally aligned, are aggregated and compared with longitudinally (circumferentially) adjacent aggregated tire tread measurements to detect the presence of tread sipes or notches extending in a generally lateral direction within the shoulder region. The typical depth of shoulder notches within a sub-range of each shoulder area, referred to as an aggregate notch depth estimate, is computed, and compared with a selected threshold to identify excessive shoulder wear, bald shoulders, or flat spots within the tire tread shoulder region. An indication is then provided to an operator, such as by color-coding a generated image of the tire tread surface, of the problem area.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
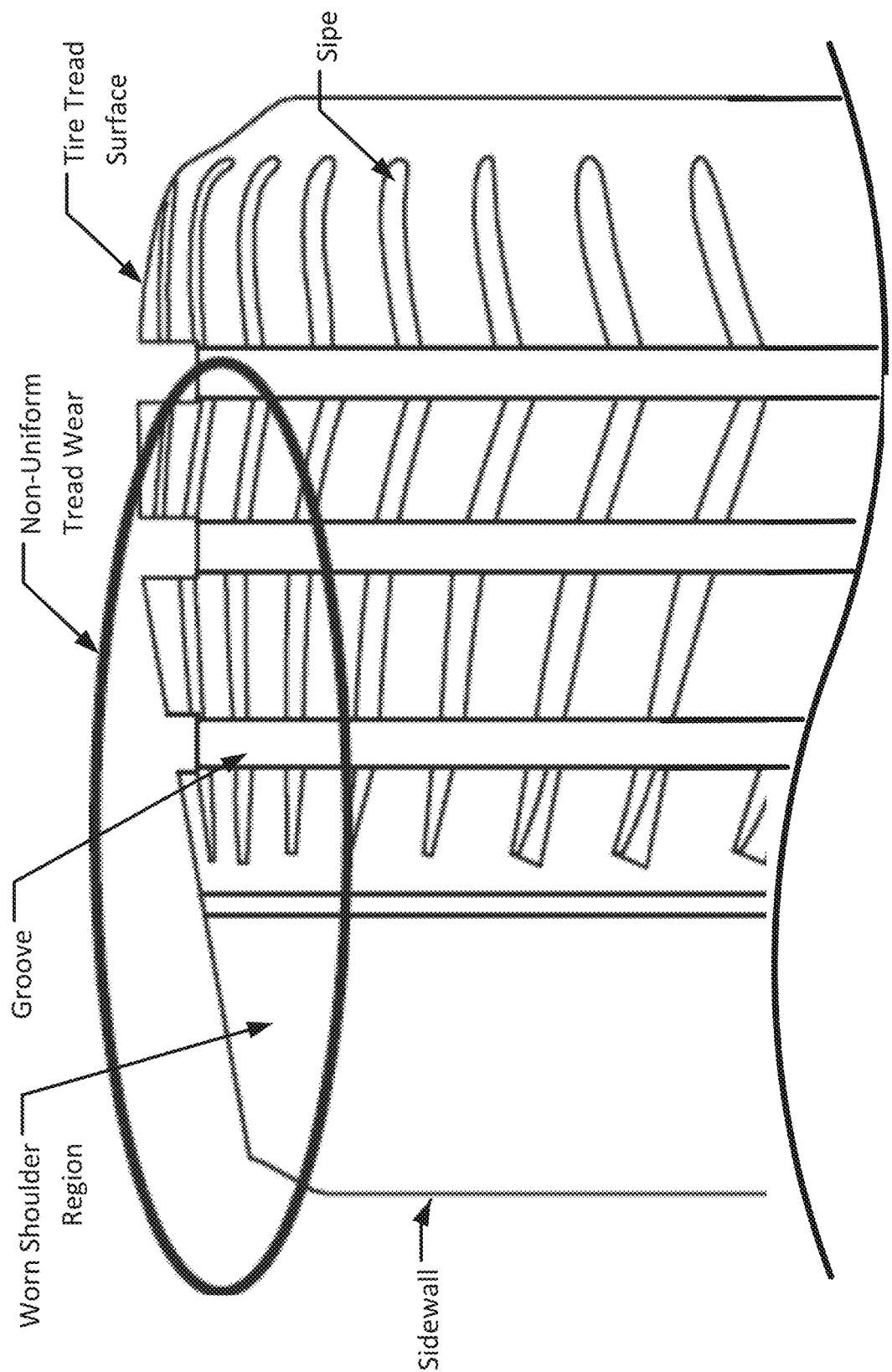
FIG. 1 is a prior art view illustration of excessive wear on a shoulder region of a tire tread surface.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 2:
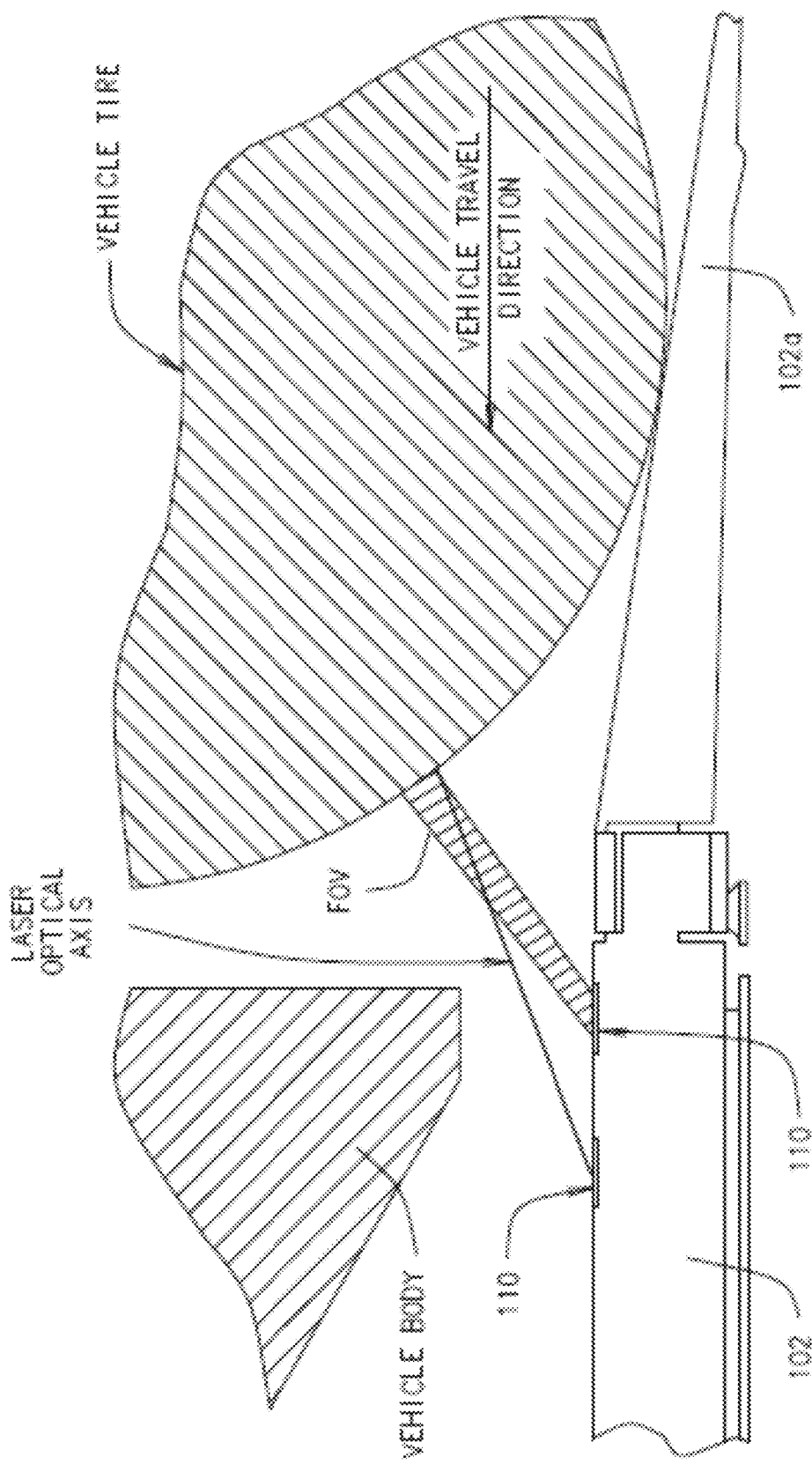
FIG. 2 is a side view of a prior art drive-over tire tread depth measurement system for acquiring tread depth data across a tire tread surface.
Figure 3:
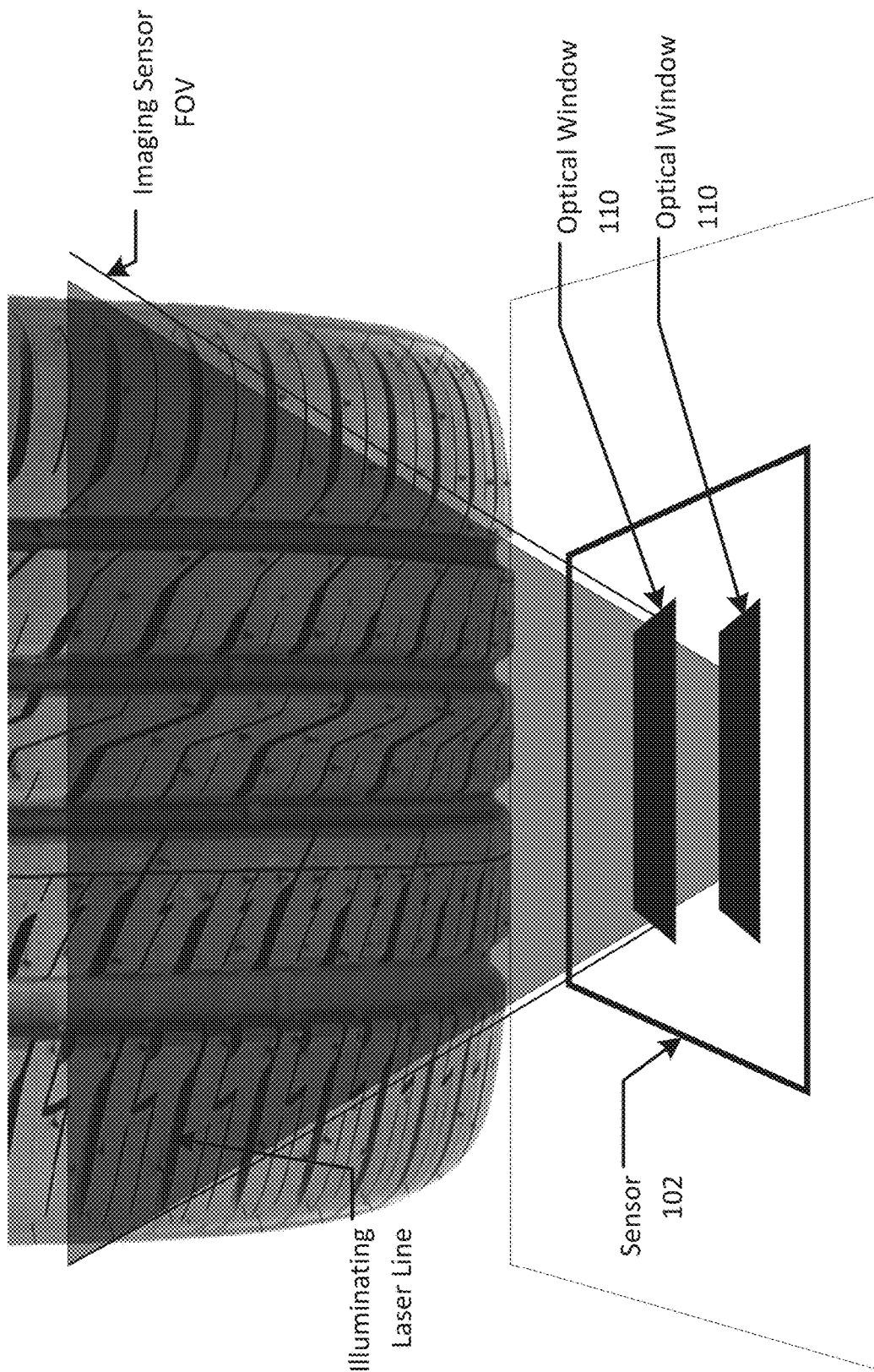
FIG. 3 is a prior art view illustration of a tire tread surface illuminated and observed by the tread depth measurement system of FIG. 2 during operation.
Figure 4:
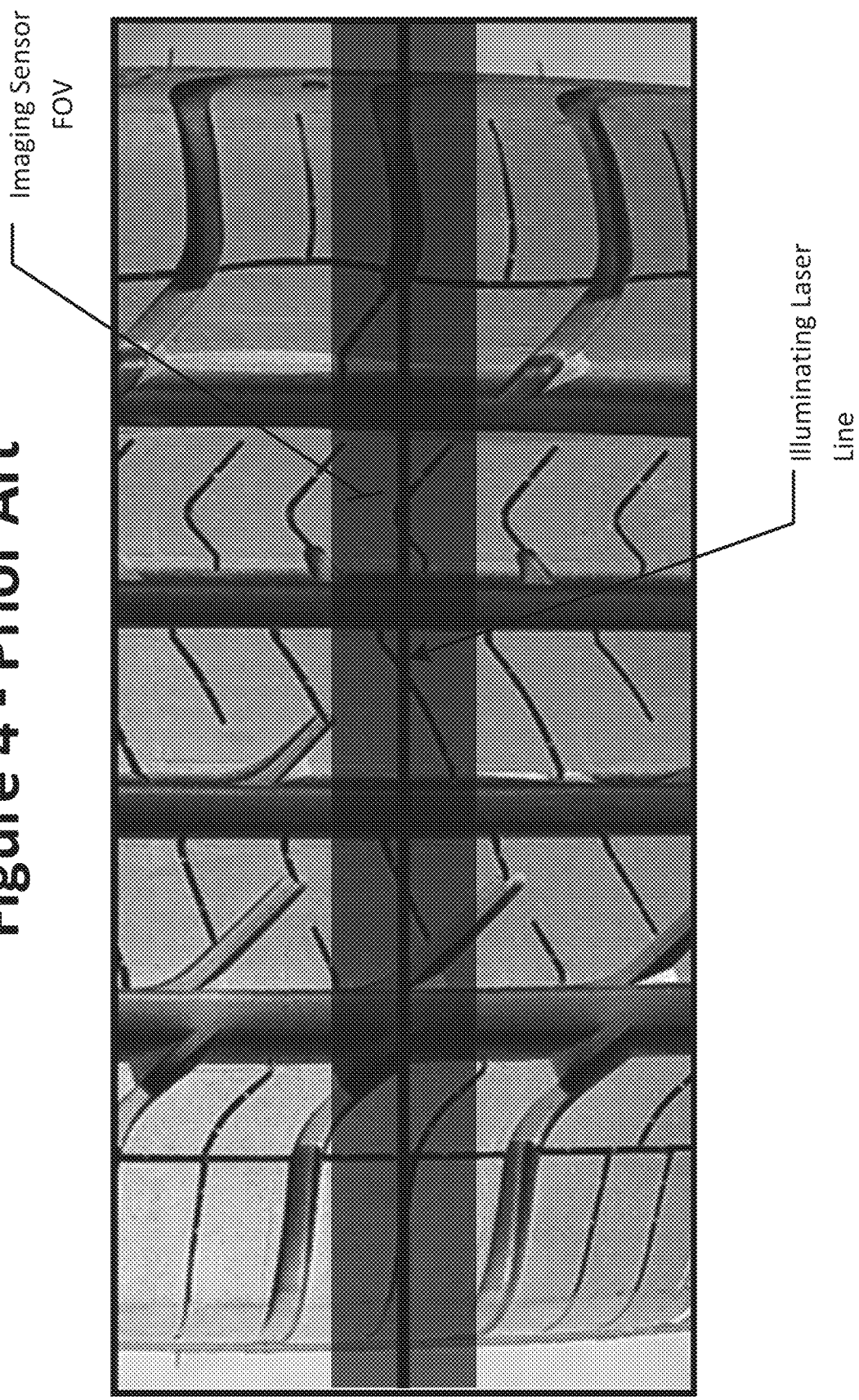
FIG. 4 is a prior art illustration similar to FIG. 3, illustrating a single lateral linear strip of tire tread surface illuminated and observed by the tread depth measurement system of FIG. 2 during operation.

While the methods of the present disclosure will be described in conjunction with the use of a drive-over tire tread depth measurement system configured as illustrated in FIGS. 2-4, it will be understood that these methods can be utilized with a variety of different tire tread depth measurement systems, so long as an adequate number of tire tread depth measurements are acquired over a surface region or "patch" on the tire tread surface which extends in both a circumferential direction and a lateral direction.

Turning to FIGS. 2-4, an exemplary prior art drive over tire tread depth measurement sensor 102, such as described in detail in U.S. Pat. No. 9,046,446 to Carroll et al., is shown for acquiring tread depth measurements over a surface region on a tire surface as a vehicle drives over the sensor 102. As the vehicle approaches the sensor 102, the vehicle wheel rolls onto an approach ramp 102a or other initial surface. A trigger (not shown) disposed in proximity to the initial surface activates the sensor 102 when the wheel has reached an ideal location relative to the measurement components of the sensor 102. Once activated, the sensor 102 projects an illuminating sheet of light, such as from a laser emitter or LED and associated optical elements, through an optical window 110 towards the approaching wheel. As best seen in FIGS. 3 and 4, the illuminating sheet of light is oriented generally transverse to the tread surface of the approaching wheel, and illuminates a line of light across the tread surface.

Figure 5:
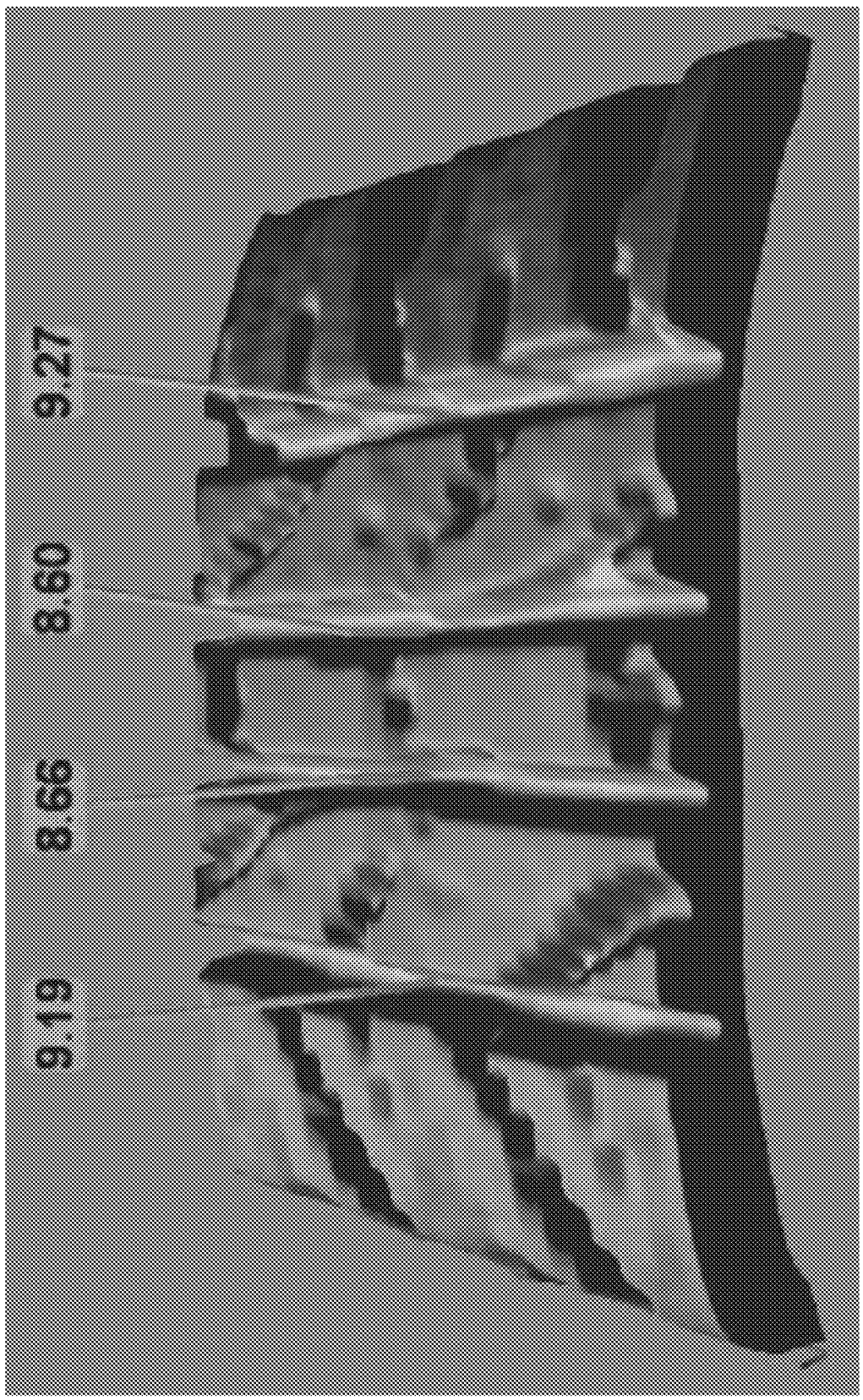
FIG. 5 is a prior art rendering of a tire tread surface generated from measurement data acquired by the tread depth measurement system of FIG. 2.

An optical sensor within the measurement sensor 102, having a field of view oriented towards the approaching wheel, captures a set of images of the illuminated line reflected from the tread surface, such as shown in FIG. 4. Due to the rolling movement of the approaching wheel, the illuminated line is swept over a circumferential portion of the tire tread surface during the period of time in which the set of images are captured. Processing of the acquired images by a processor or logic circuit configured with appropriate software instructions, together with the known and fixed geometric relationships between the light sources, the sheet of light, the reflected light, and the optical sensor, enables triangulation calculations to establish a plurality of displacement measurements to points on the illuminated tire surfaces. The plurality of displacement measurement points form a point cloud of data, which can be subsequently evaluated and manipulated by the suitably programmed logic circuit or processor to render an image of the observed tire tread surface, such as the perspective rendering shown in FIG. 5, annotated to indicate various tread features and depths, such as described in U.S. Pat. No. 9,805,697 to Dorrance et al.

More specifically the plurality of displacement measurement points define a two-dimensional array where each element represents the "tread depth" at a point on the tire's tread surface that lies within a rectangular "tread patch" covering a portion of the tire's rolling surface. This tread patch preferably has a lateral width which encompasses the full width of the tire's road-gripping tread area, plus a portion of the sidewall surface on both ends. For a typical automotive tire, this lateral width represents a distance whose value lies between 4.0 and 10.0 inches. The longitudinal or circumferential dimension of the tread patch is representative of a portion of the circumference of the tire's rolling surface. The magnitude of the tread patch longitudinal or circumferential dimension typically ranges from about 0.5 to 3.0 inches.

However, while conventional tire tread depth measurement evaluation procedures can distinguish and identify the depth of various tread surface features, such as major circumferential grooves and notches, the procedures lack an ability to distinguish between normal shoulder regions and excessively worn shoulder regions of a tread surface due to the general lack of circumferential features within the shoulder regions, the normally convex curvature of the tread surface, and the open-ended nature of lateral or diagonal grooves or notches within the shoulder region.

Figure 6:
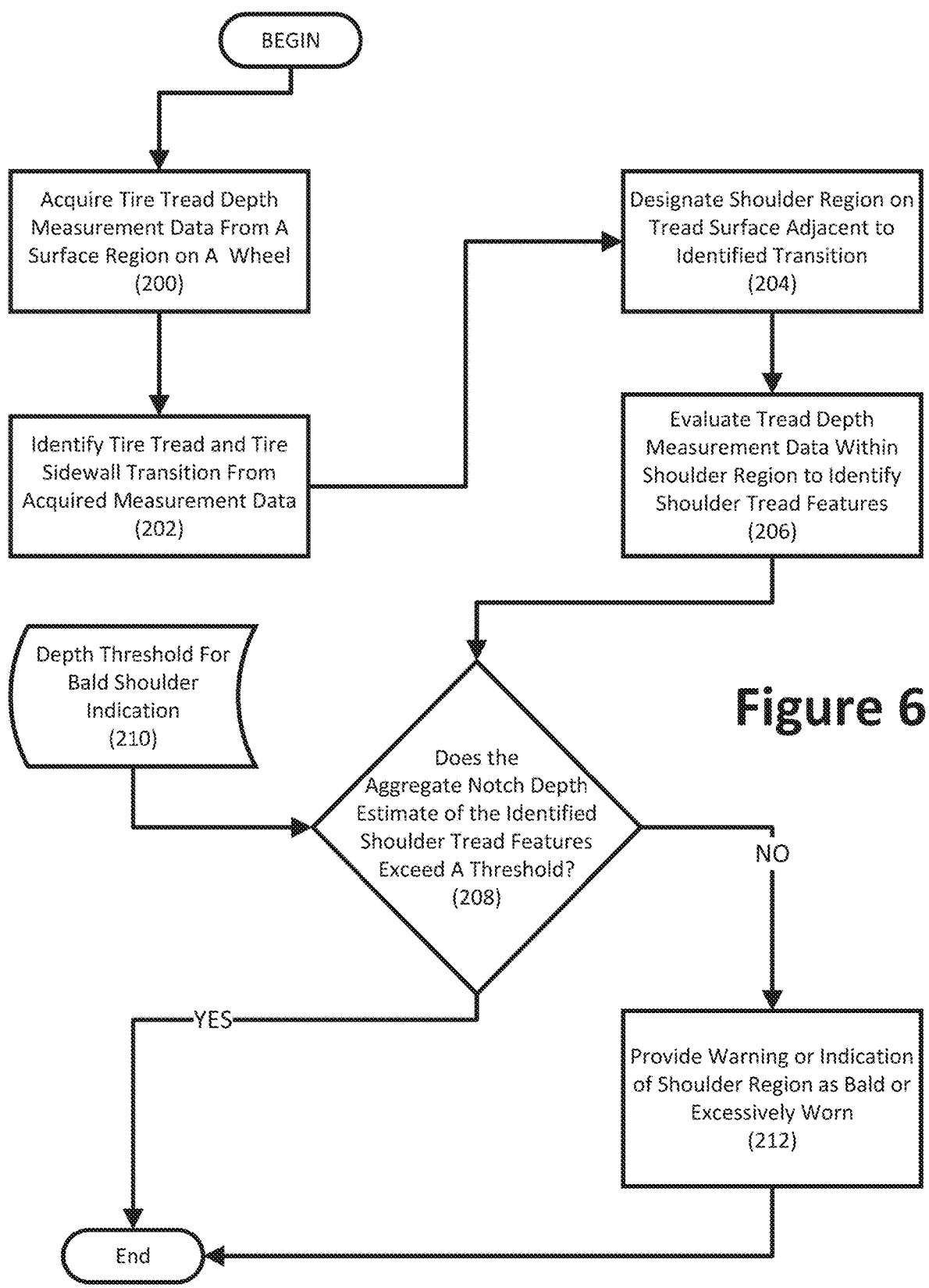
FIG. 6 is a flow chart illustrating the steps of a method of the present disclosure for identifying and warning of shoulder wear on a tire tread surface.
Figure 7:
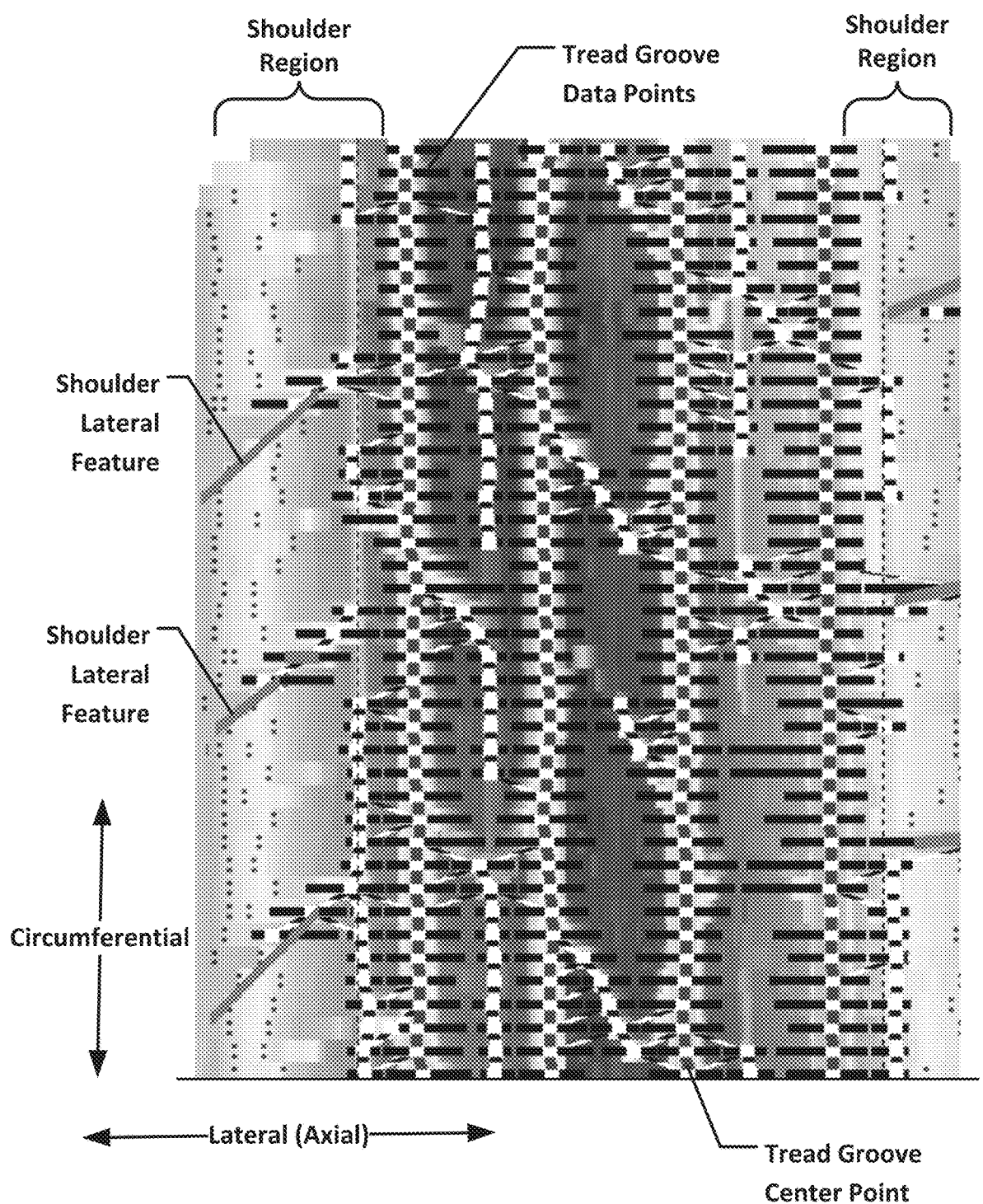
FIG. 7 is a colorized two-dimensional representation of a tire tread surface generated from measurement data acquired by the tire tread depth measurement system of FIG. 2, overlaid with identified tire tread depth data points and tread features.

In order to both identify relevant shoulder regions on a tire tread surface and evaluate their condition, a method of the present disclosure, as implementing in a suitably programmed processor or logic circuit of the drive-over tire tread depth measurement system, and illustrated in the flowchart of FIG. 6, begins by acquiring (at Box 200) a plurality of tire tread measurements representative of tread depths within a region of interest on a tire surface which extends both laterally (parallel to the tire's rotational axis) and circumferentially (around the tire's rotational axis) over a portion of the tire tread surface. Preferably, the region of interest includes a portion of at least one shoulder of the tire tread surface, such as shown in FIG. 7.

Once the tire tread depth measurement data is acquired, the programed processor or logic circuit identifies transition regions between the tire tread surface and one or both of the tire sidewall surfaces (Box 202). To identify the transition regions in one embodiment of the present disclosure, a virtual representation of a convex surface extending across the lateral dimension of the region of interest is established for each lateral scan line within the region of interest from the plurality of tire tread measurements. Each scan line can be treated as a row of data points extending in a lateral direction across the tire surface. Within the set of scan lines, circumferentially aligned data points can be treated as columns within an array of data points. This virtual representation models the overall crown of the tire tread surface, but does not show any locally concave or recessed areas such as the tread grooves or notches. The convex surface is a series of line segments that approximate a crowned profile of each lateral scan line. Segments of the tire tread surface near the lateral center of each scan line have a slope of very small magnitude, with the segment slopes growing increasingly steep in either lateral direction approaching the tire sidewalls. From scan line to scan line, there can be significant variation in the convex surface shape. Such variation can have many causes, but one contributor is the fact that some scan line profiles are affected by the presence of generally lateral tread features such as notches near the shoulder bend area while other scan lines pass between the shoulder notches and are therefore largely unaffected by the shoulder notches.

Typical automotive tires exhibit a somewhat sharp foldover or transition in a cross-sectional slice taken through the tire tread and sidewall surfaces, demarking the tread surface from the sidewall surface. Accordingly, one or more circumferentially extending regions of the convex surface representation which exhibit a sharp or distinct change in surface slope are identified as transitions separating the circumferential band of the tire tread surface from the radially inward projection of the inner and/or outer tire sidewall surfaces. Circumferentially extending tire tread surfaces in the lateral vicinity of the identified surface slope transitions are further designated as shoulder regions for subsequent evaluation (Box 204). A boundary point is identified within each scan line as the location where the convex surface slope passes a particular "critical angle" threshold. For example, the outer shoulder boundary point may be placed at the vertex along the convex surface where the change in slope passes a threshold angle of 45 degrees, while an inner boundary point of the shoulder may be chosen as the vertex where the change in slope passes a threshold of 17 degrees. Both of the vertex points along a scan line's convex surface and the chosen shoulder boundary points represent lateral positions within the rectangular point cloud information for the tire tread patch. These positions are recorded as column numbers of the point cloud's two-dimensional array of tire surface depth values. Each step in a column index along a row of the tread patch (otherwise known as a scan line) represents a constant physical distance laterally across the tread surface of the tire, and corresponds to the lateral sampling interval of the point cloud.

Statistical techniques are then used to identify a general inner and outer bound for a circumferential shoulder stripe on each side of the tire tread surface, using the inner and outer boundary points obtained from the chosen convex surface vertices on each scan lines of the tread patch. To determine a particular shoulder bound for an entire side of the tread patch (inner or outer), there is initially a sorting of the column numbers chosen for the corresponding boundary points from all the individual scan lines. The general bound column for the tread patch is then chosen as the median value at the middle of the sorted set of boundary columns from the scan lines.

Next, tread depth measurement data within the identified shoulder regions is evaluated to locate tread features such as grooves, sipes, or notches extending in a generally lateral direction within the identified shoulder regions of the tread surface. (Box 206). Aggregating or averaging laterally aligned tire tread measurements within the identified shoulder regions, and subsequently comparing longitudinally (circumferentially) adjacent aggregated tire tread measurements can, by finding changes in tread depth, detect the presence of various tread features extending in a generally lateral (axial) direction within the shoulder regions of the tread surface. This may be done by circumferentially scanning the tire tread measurements within the shoulder region using averaged batches of laterally adjacent tire tread measurements to detect signatures of primarily lateral tread features in the shoulder region. The detected signatures are then aggregated or averaged across batches of laterally adjacent tire tread measurements to build a composite representation of each tread feature.

An exemplary technique for detecting the shoulder tread features is to pick a particular column of the tread surface data and sequentially evaluate the range of scan lines, looking for a signature where a tread surface depth sharply increases by several millimeters and then decreases back to approximately the original depth. These data points are illustrated as horizontal line segments of tread groove data points in FIG. 7. A notch signature search may be repeated for each column that lies within the identified shoulder stripe on one side of the tire tread surface. Alternatively, depth information from a small "batch" or sub-range of adjacent columns may be aggregated when pursuing the search for shoulder tread feature signatures. This aggregation of data across a small set of adjacent columns serves both to reduce tread depth noise due to averaging effects and provides an execution speed improvement. The recognition of shoulder tread feature signatures variations in tread depth values are examined, going from scan line to scan line, is dependent upon presumed limits of the physical width of the generally horizontal tread features in the tire shoulder. The recognition logic requires that the increasing and decreasing transitions in surface depth be separated circumferentially by an appropriate number of scan lines. Such scan line count minimum and maximum thresholds are computed from the presumed typical width of a shoulder tread feature in millimeters, and from an estimate of the circumferential sampling interval of the point cloud data, i.e., the millimeter spacing between scan lines. The estimate of the circumferential sampling interval of the tread patch point cloud is based upon observation of a rate at which the tire surface moves towards the optical sensor in the drive-over tire tread depth measurement system, and is further based on geometric relationships between translational and rotational movement rates that can be expected for an automotive tire of typical diameter.

Detected shoulder tread feature signatures are then aggregated across laterally adjacent batches of columns to build a composite tread feature, diagnostically shown as a parallelogram or line segment in FIG. 7. Each time a circumferential scan through one of the identified shoulder regions detects an appropriate shoulder tread feature signature, the presence of the segment is recorded. This represents finding a small piece of a tread feature, with a lateral span of size roughly equal to one millimeter. Each new tread feature segment found is potentially an extension of a previously identified tread feature segment. By the time the shoulder tread feature search is completed, an associated list of tread features found within each shoulder region is established, where each identified tread feature is built up from one or more narrow tread features segments. The completed tread features can have a lateral width that ranges from roughly one millimeter to perhaps dozens of millimeters. The tread feature building process is accepting both of tread features that have an orientation very close to the expected lateral direction, and of tread features that have a substantially diagonal orientation, such as seen in FIG. 7. A selected threshold limits the extent of diagonal orientation permitted, so that tread features which extend in a substantially circumferential direction, rather than a lateral direction, are not utilized.

Next, an "aggregate notch depth estimate" for each shoulder is made by aggregating depths of identified tread features that lie within a targeted sub-range of each shoulder area. The sub-range is preferably selected to encompass a laterally outward portion of each shoulder tread feature, which is the part of the shoulder tread feature leading up to the relatively sharp bend in the surface that separates the tread area from the tire sidewall. Limited scanning rates cause many of the identified tread features depth measurements to be substantially shallower than would be detected if scans could be separated by an infinitesimally small spatial scan interval. Therefore, after filtering to remove noise spikes, an aggregate notch depth rating for the shoulder region can be taken as the depth of the deepest credibly-measured identified tread feature within the shoulder sub-range of interest. This aggregate notch depth rating for the shoulder region is compared (Box 208) with a selected threshold (Box 210) to identify excessive shoulder wear, bald shoulders, or flat spots within the tire tread shoulder region. The selected threshold (Box 210) may be chosen in accordance with various local laws establishing permissible tire tread wear, manufacturer recommendations for tire replacement, operator preference, or industry accepted guidelines.

Alternatively, a spatial density score of the detected tread features within the tire tread shoulder region is computed in place of the aggregate notch depth rating. The density score is compared with a corresponding selected threshold to identify excessive shoulder wear, bald shoulders, or flat spots within the tire tread should region. There are two major measurement factors involved in obtaining a shoulder spatial density score from the set of tread features identified on a shoulder of a tread patch. The first factor is the percentage of the shoulder region lateral width that is covered by the length of a detected tread feature. If an identified tread feature is half as wide as the shoulder region itself, that tread feature is weighted at a 50 percent contribution towards the density score for that shoulder region. A second factor is the circumferential density of the identified tread features, in comparison with typical tread feature spacing in features per millimeter for a typical tire. If the identified tread features have full width and are spaced at circumferential intervals equal to the nominal intervals, the shoulder spatial density score will be 100. But if the tread feature intervals are twice as long as the nominal intervals, the score will be reduced proportionally to 50. The ratio-based reduction due to circumferential spacing is multiplied by the ratio reduction due to tread features not covering the full shoulder lateral width. In practice, a shoulder spatial density score on tires with little or no wear will be approximately 20.

Figure 8:
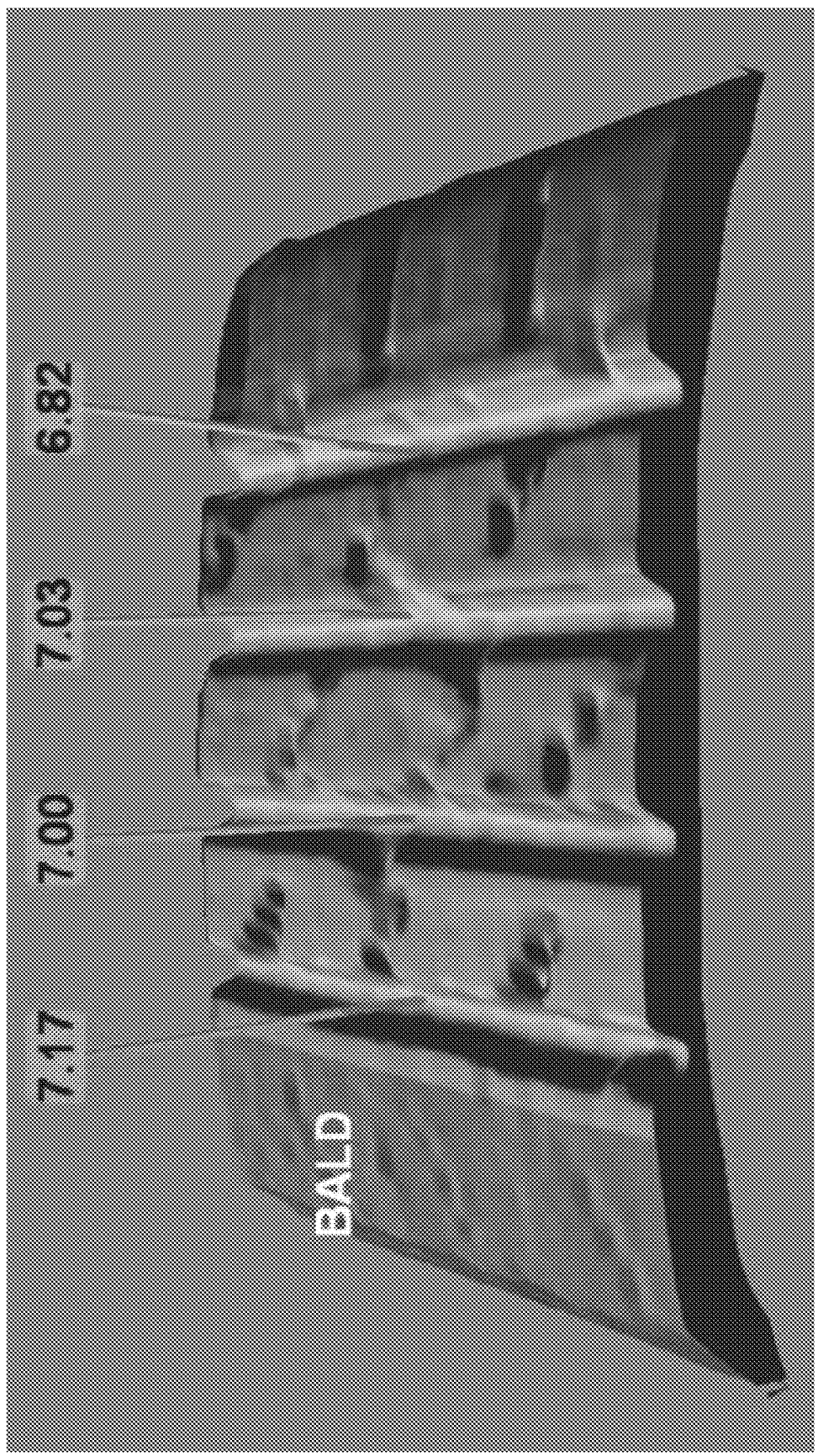
FIG. 8 is a perspective rendering of a tire tread surface having detected shoulder wear generated from measurement data acquired by the tread depth measurement system of FIG. 2.

If the comparisons of the aggregate notch depth rating (or alternatively, the spatial density score) indicates that the depth rating (or alternatively, the spatial density) of the tread features is below the threshold, an indication is provided to an operator (Box 212), such as by color-coding and/or labeling the relevant shoulder region within the generated image of the tire tread surface, such as shown by the dark shading and "bald" labels illustrated in the exemplary tire tread renderings of FIG. 8.

While the methods of the present disclosure have been described in the context of identifying and detecting tread features within the shoulder region of a tire tread surface, it will be recognized that the concepts and procedures can be easily adapted to identify and detect bald or excessively worn regions anywhere within a tire tread surface by appropriately delimiting the region to be evaluated, detecting the presence of tread features having at least a predetermined depth and/or common characteristics (such as diagonally oriented notches), and evaluating tread feature aggregate notch depth estimates or spatial density values for the tread features within the selected region. Responsive to the tread feature aggregate notch depth estimate or spatial density value being below a threshold, indicating a lack of tread features within the selected region, an output representing excessive tread wear or baldness is generated.

As an alternative to identifying worn shoulder regions of a tire by either an aggregate notch depth estimate or a spatial density score associated with detected tread features present within the shoulder region, the cross-sectional shape of the tire surface may be utilized. A cross-section of a tire that is not worn tends to present an obtuse surface angle at the lateral boundary between one of the sidewalls and the tire tread region. Actual rounding of this obtuse angle is on the order of a very small radius, perhaps a millimeter. When heavy cornering action starts to wear away tire tread rubber on such a shoulder bend point, the formerly well-defined obtuse angle changes shape. As the point wears off, the worn profile of the shoulder bend area exhibits a combination of chamfering and rounding. The degree to which the shoulder bend of a tire shoulder has been chamfered and/or rounded can be mathematically measured from the tire tread measurement point cloud data. With appropriate scale factors, this information can be used to produce a numerical score of shoulder bend degradation. An overall shoulder wear score that is the combination of two components can be computed using the suitably programmed logic circuit or processor. The first component is based upon the shoulder notch density score described above. The second component is based upon the estimate of the degree to which the shoulder bend point has been degraded by chamfering and rounding. The two components are combined in a manner that respects the opposite polarities of the two components; i.e., high shoulder notch density tends to mean a tire is good and high bend point wear tends to mean a tire is bad.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A computer-implemented method for operating a tire tread depth measurement system to identify worn tread shoulder regions on a tire having a lateral tread surface extending circumferentially about an axis between a pair of radially projected sidewall surfaces, comprising:

acquiring a plurality of measurements representative of tread depth within a region of interest extending both laterally and circumferentially over at least a portion of said tire tread surface, said region of interest including at least a portion of a shoulder region and a portion of a sidewall surface adjacent to said shoulder region;

evaluating said plurality of measurements to identify a lateral location of a circumferential transition between said tread surface and said sidewall surface;

designating a shoulder region within said tread surface adjacent to said identified circumferential transition, said shoulder region having a width extending laterally into said tire tread surface from said identified transition and extending circumferentially about said axis;

locating, within said designated shoulder region, tread features having a generally lateral orientation;

aggregating depth measurements for each of said located tread features within said designated shoulder region to establish an aggregate notch depth estimate within said designated shoulder region;

comparing said aggregate notch depth estimate with a threshold to identify excessive tread wear within said designated shoulder region; and responsive to an identification of excessive tread wear within said designated shoulder region, generating an output visually representing said excessive tread wear to an operator.

2. The method of claim 1 wherein evaluating said plurality of measurements to identify said lateral location of said circumferential transition includes establishing a convex surface representation of said region of interest from said plurality of measurements; and evaluating a lateral surface slope for said established convex surface representation to laterally locate at least one circumferentially extending area where a change in said lateral surface slope exceeds a threshold, said circumferentially extending area identifying said circumferential transition between said tread surface and said sidewall surface.

3. The method of claim 1 wherein said plurality of measurements representative of tread depths are arranged circumferentially in aligned columns and laterally in axially aligned rows;

wherein said step of locating tread features within said designated shoulder region having generally lateral orientation further includes, within each laterally aligned row, averaging a plurality of measurements to form an aggregated lateral depth measurement; and comparing groups of circumferentially spaced aggregated lateral depth measurements to detect tread depth changes identifying said tread features having a generally lateral orientation.

4. The method of claim 1 further including the step of creating, from said plurality of measurements representative of tread depth, a visual representation of said tread surface; and wherein said step of generating an output representing said excessive tread wear includes altering said visual representation of said tread surface with either color and/or an alpha-numeric designation denoting said excessive tread wear on said tread surface.

5. A method for identifying worn tread shoulder regions on a tire having a tread surface extending circumferentially about an axis and extending axially between a pair of radially projected sidewall surfaces, comprising:

acquiring a plurality of measurements representative of tread depth within a shoulder region of interest extending both axially and circumferentially over at least a portion of said tire tread surface adjacent to one of said radially projected sidewall surfaces;

identifying, from said plurality of measurements, tread features extending laterally outward towards said radially projected sidewall surface within said shoulder region of interest having at least a predetermined depth and/or at least one common characteristic;

comparing an aggregate notch depth of said identified tread features within said shoulder region of interest to a notch depth threshold to establish a presence of excessive tread wear within said shoulder region of interest; and responsive to a presence of excessive tread wear, generating an output to an operator representing said excessive tread wear.

6. The method of claim 5 further including the step of creating, from said plurality of measurements representative of tread depth, a visual representation of said tread surface within said tread shoulder region; and wherein said step of generating said output representing said excessive tread wear includes annotating said visual representation of said tread surface within said tread shoulder region with either color and/or an alpha-numeric designation denoting said excessive tread wear on said shoulder region.

7. A method for identifying worn tread shoulder regions on a tire having a tread surface extending circumferentially about an axis between a pair of radially projected sidewall surfaces, comprising:

acquiring a plurality of measurements representative of tread depth within a region of interest extending both laterally and circumferentially over at least a portion of said tire tread surface, said region including at least a portion of one shoulder region and a portion of at least one of said sidewall surfaces;

evaluating said plurality of measurements to identify at least one transition between said tread surface and said pair of sidewall surfaces;

designating a shoulder region within said tread surface adjacent to said identified at least one transition;

identifying, within said designated shoulder region, tread features having a generally lateral orientation;

comparing a spatial density of said identified tread features within said designated shoulder region with a spatial density threshold to identify excessive tread wear within said designated shoulder region; and responsive to an identification of excessive tread wear within said designated shoulder region, generating an output representing said region of excessive tread wear.

8. The method of claim 7 wherein said step of comparing includes applying a weighting factor to said spatial density of said identified tread features, said weighting factor associated with a lateral width of each of said identified tread features within said designated shoulder region.

9. A computer-implemented method to identify worn tread shoulder regions on a tire having a lateral tread surface extending circumferentially about an axis between a pair of radially projected sidewall surfaces, comprising executing with a programmed processor the steps of:

acquiring a plurality of circumferentially spaced lateral rows of measurements representative of tread depth within a tire surface region of interest, said region of interest extending both laterally and circumferentially over at least a portion of said tire tread surface and including at least a portion of a shoulder region and an adjacent sidewall surface;

establishing, for each of said plurality of lateral rows of measurements, an associated convex curve representative of said tire tread surface crown in the lateral direction, each of said associated convex curves composed of a plurality of lateral segments;

evaluating, for each of said associated convex curves, slope values of adjacent lateral segments within each curve to identify transitions between sidewall surfaces, shoulder surfaces, and tire tread surfaces in response to changes in said slope values exceeding selected slope thresholds, whereby said identified transitions in each convex curve collectively define at least one shoulder region extending both laterally and circumferentially on said tire surface;

locating, within said defined shoulder region, tread features having a generally lateral orientation;

aggregating depth measurements for each of said laterally oriented tread features within said defined shoulder region to establish an aggregate notch depth estimate for said defined shoulder region;

comparing said aggregate notch depth estimate with a depth threshold to identify excessive shoulder tread wear within said defined shoulder region; and responsive to an identification of excessive shoulder tread wear within said defined shoulder region, generating an output visually representing said excessive shoulder tread wear to an operator.

* * * * *